United States Patent
Ku

(10) Patent No.: US 8,976,469 B2
(45) Date of Patent: Mar. 10, 2015

(54) LENS DRIVING SYSTEM AND METHOD

(71) Applicant: Hon Hai Precision Industry Co., Ltd., New Taipei (TW)

(72) Inventor: Ping-Han Ku, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/093,051

(22) Filed: Nov. 29, 2013

(65) Prior Publication Data

US 2014/0355140 A1 Dec. 4, 2014

(30) Foreign Application Priority Data

May 29, 2013 (TW) .............................. 102118883 A

(51) Int. Cl.
*G02B 7/02* (2006.01)
*G03B 13/00* (2006.01)
*G02B 7/04* (2006.01)

(52) U.S. Cl.
CPC ........................................ *G02B 7/04* (2013.01)
USPC .................... 359/823; 348/220.1; 348/222.1; 348/345; 348/349; 396/79; 396/80

(58) Field of Classification Search
CPC .............. G02B 7/02; G02B 7/04; G02B 7/09; G02B 7/28; G03B 3/00; G03B 3/10; G03B 13/00; G03B 13/32; G03B 13/34; G03B 13/36; H04N 5/232
USPC .................... 359/822, 823, 825; 348/E5.042, 348/E5.045, 220.1, 222.1, 345, 346, 348, 348/349, 351, 354; 396/77–82, 123–125, 396/128

See application file for complete search history.

(56) References Cited

U.S. PATENT DOCUMENTS

| | | | | |
|---|---|---|---|---|
| 7,536,096 B2 * | 5/2009 | Ito et al. | ........................... | 396/90 |
| 7,620,311 B2 * | 11/2009 | Ito et al. | ........................ | 396/125 |
| 8,144,236 B2 * | 3/2012 | Shikata | ......................... | 348/345 |
| 8,203,642 B2 * | 6/2012 | Sogawa et al. | ................ | 348/345 |
| 8,427,570 B2 * | 4/2013 | Adachi et al. | ................. | 348/335 |
| 8,730,379 B2 * | 5/2014 | Lin | ............................... | 348/349 |

* cited by examiner

*Primary Examiner* — Loha Ben
(74) *Attorney, Agent, or Firm* — Novak Druce Connolly Bove + Quigg LLP

(57) ABSTRACT

A lens driving system is configured for driving a lens to a focus position, and includes a control unit and a driving unit electrically connected to the control unit and coupled with the lens. The control unit acquires the focus position, calculates a main current value according to the focus position, and calculates a number of secondary current values according to the main current value. The secondary current values gradually increase to the main current value. The driving unit drives the lens to the focus position according to the secondary current values.

8 Claims, 2 Drawing Sheets

LENS DRIVING SYSTEM AND METHOD

BACKGROUND

1. Technical Field

The present disclosure relates to driving technologies, and particularly to a lens driving system and a lens driving method.

2. Description of Related Art

Lens driving systems generally include a control unit and a driving unit connected to the control unit. The control unit outputs a driving current to the driving unit, and the driving unit drives a lens to a focus position according to the driving current. The greater the driving current is, the farther the lens moves. As such, when the focus position is far away from an original position of the lens, a great driving current is required. However, when the driving current is too great, the driving unit may vibrate strongly, which may decrease a focus precision.

Therefore, it is desirable to provide a lens driving system and a lens driving method to overcome the limitations described.

DETAILED DESCRIPTION

Embodiments of the disclosure will be described with reference to the drawings.

Figure 1:
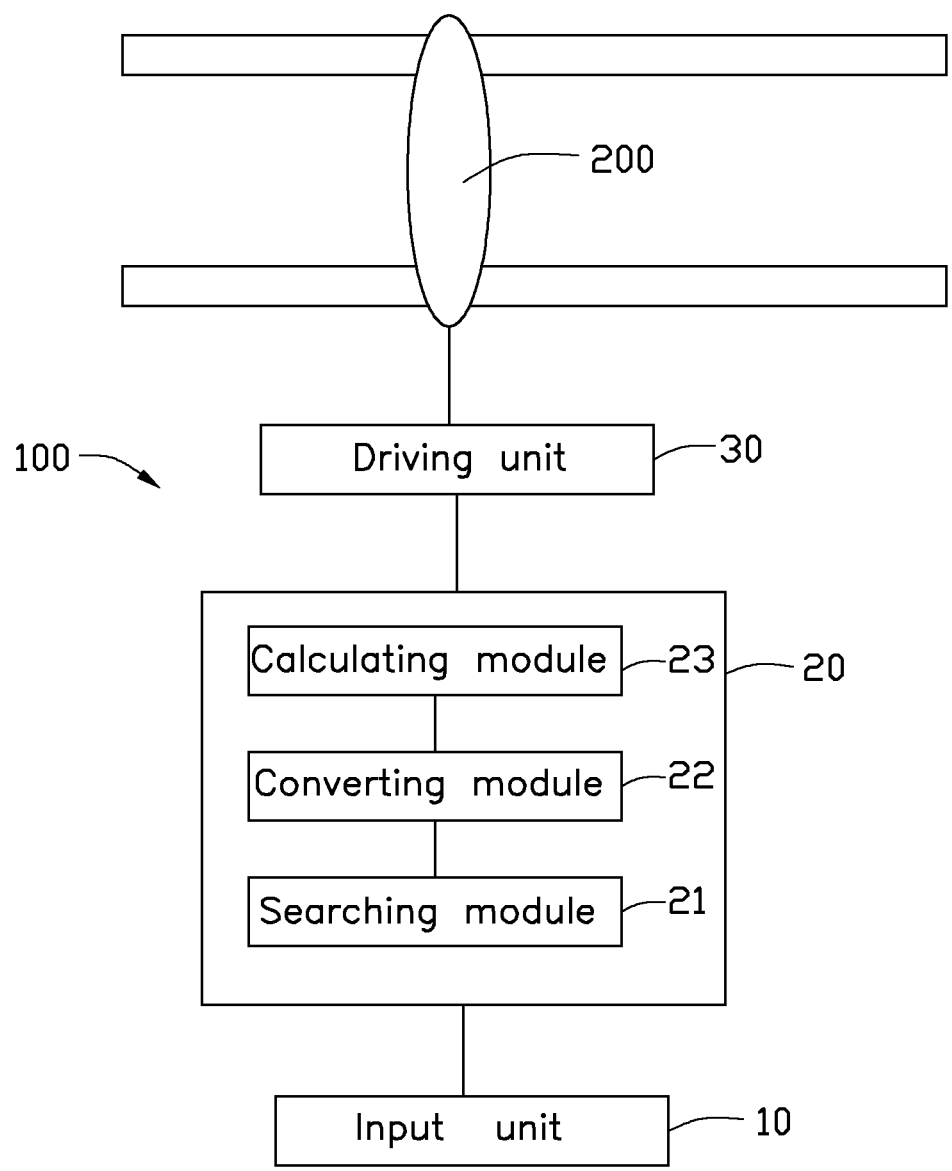
FIG. 1 is a functional block diagram of a lens driving system in accordance with an exemplary embodiment.

FIG. 1 shows a lens driving system 100, which is used to drive a lens 200 to a focused position. The lens driving system 100 includes an input unit 10, a control unit 20, and a driving unit 30.

The input unit 10 is used to receive a focus instruction. In the embodiment, the input unit 10 is a touch panel, a button, or an audio receiving module. The input unit 10 outputs a focus signal according to the focus instruction.

The control unit 20 is electrically connected to the input unit 10. The control unit 20 includes a searching module 21, a converting module 22, and a calculating module 23. The converting module 22 is connected between the searching module 21 and the calculating module 23.

The searching module 21 is configured for searching a focus position of the lens 200 according to the focus signal output from the input unit 10. The converting module 22 is configured for calculating a main current value according to the focus position received from the search module 21. The main current value corresponds to the focus position. The calculating module 23 is configured for calculating a number of secondary current values according to the main current value received from the converting module 22. The secondary current values gradually increase to the main current value.

In the embodiment, the control unit 20 is a central processing unit. The main current value is I. The number of the secondary current values is N. The secondary current values is 0, I/N, 2I/N, 3I/N . . . (N−1)I/N, I. The number of the secondary current values can be pre-stored.

The driving unit 30 is electrically connected to the calculating module 23 of the control unit 20, and couples with the lens 200. The control unit 20 outputs the gradually increased secondary current values to the driving unit 30. The driving unit 30 drives the lens 200 to the focus position according to the secondary current values.

In the embodiment, the driving unit 30 is a voice coil motor. Time intervals of two adjacent secondary current values are constant.

During focus, a user inputs a focus instruction to the lens driving system 100 via the input unit 10. The input unit 10 outputs the focus signal according to the focus instruction. The searching module 21 searches the focus position according to the focus signal. The converting module 22 outputs a main current value, such as 30 mA, according to the focus position. The calculating module 23 calculates a number of secondary current values, such as 10 mA, 20 mA, and 30 mA, according to the main current value. The driving unit 30 drives the lens 200 to the focus position according to the secondary current values.

Figure 2:
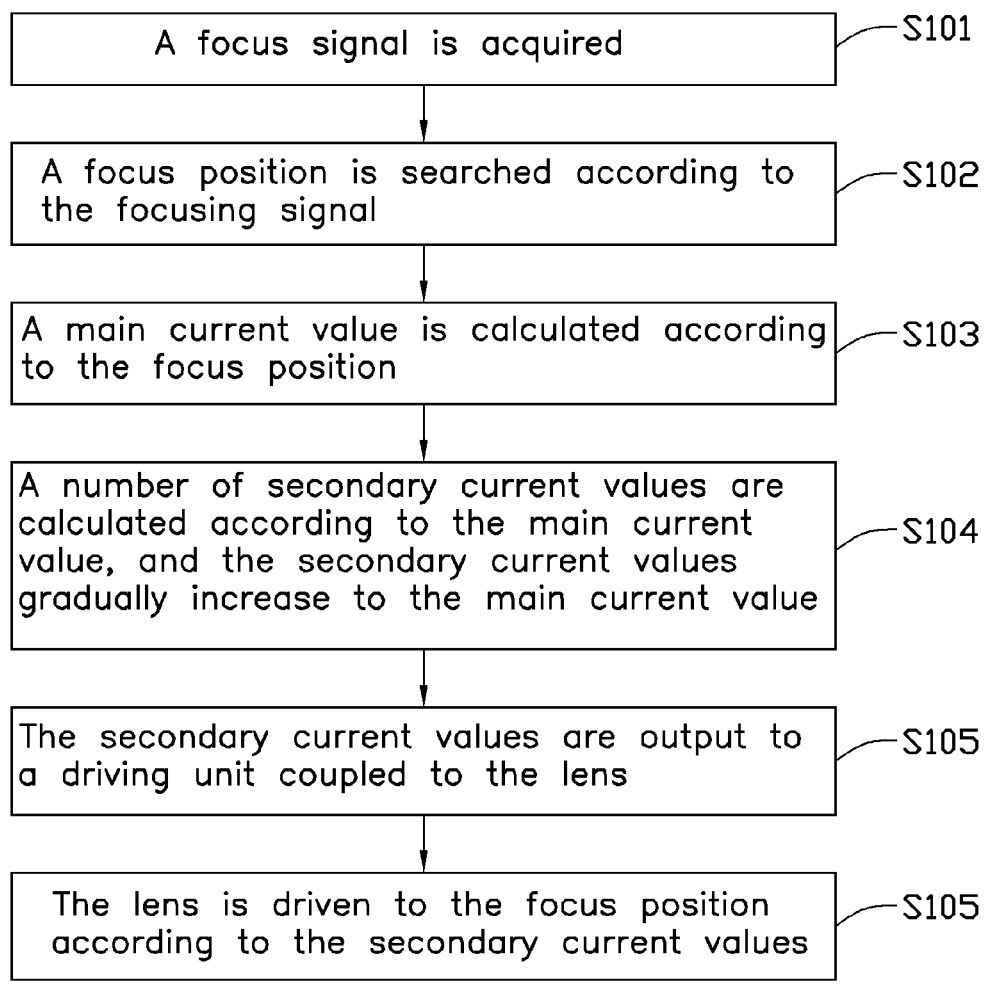
FIG. 2 is a flowchart of a lens driving method in accordance with an exemplary embodiment.

FIG. 2 shows a lens driving method, which is used to drive a lens 200 to a focus position. The lens driving method includes steps S101-S106.

S101: a focus signal is acquired. The focus signal corresponds to a focus instruction. The focus instruction is input by a user.

S102: a focus position is searched according to the focus signal.

S103: a main current value is calculated according to the focus position.

S104: a number of secondary current values are calculated according to the main current value, and the secondary current values gradually increase to the main current value.

S105: the secondary current values are output to a driving unit 30 coupled to the lens 200, the secondary current values are gradually increased. In the embodiment, time intervals of two adjacent secondary current values are constant.

S106: the lens 200 is driven to the focus position according to the secondary current values.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A lens driving system for driving a lens to a focus position, the lens driving system comprising:
   a control unit; and
   a driving unit electrically connected to the control unit and coupled with the lens;
   wherein the control unit acquires the focus position, calculates a main current value according to the focus position, and calculates a plurality of secondary current values according to the main current value; the secondary current values gradually increasing to the main current value; and the driving unit driving the lens to the focus position according to the secondary current values.

2. The lens driving system of claim 1, comprising an inputting unit electrically connected to the control unit, wherein the inputting unit outputs a focus signal to the control unit, and the control unit searches the focus position according to the focus signal.

3. The lens driving system of claim 2, wherein the control unit comprises a searching module, a converting module, and a calculating module; the converting module being connected between the searching module and the calculating module.

4. The lens driving system of claim 3, wherein the searching module searches the focus position of the lens according to the focus signal outputting from the inputting unit, the converting module calculates the main current value according to the focus position received from the searching module, the calculating module calculates the secondary current values according to the main current value received from the converting module.

5. The lens driving system of claim 1, wherein time intervals of two adjacent secondary current values are constant.

6. A lens driving method for driving a lens to a focus position, comprising:
 acquiring a focus position;
 calculating a main current value according to the focus position;
 calculating a plurality of secondary current values according to the main current value, the secondary current values gradually increasing to the main current value;
 outputting the secondary current values to a driving unit coupled to the lens; and
 driving the lens to the focus position according to the secondary current values.

7. The lens driving method of claim 6, wherein a focus signal is acquired before acquiring the focus position.

8. The lens driving method of claim 6, wherein time intervals of two adjacent secondary current values are constant.

* * * * *